United States Patent
Chuang et al.

(10) Patent No.: US 8,595,133 B2
(45) Date of Patent: Nov. 26, 2013

(54) SYSTEM AND METHOD FOR SATISFYING A TRANSACTION AMOUNT FROM AN ALTERNATIVE FUNDING SOURCE

(75) Inventors: I-Hsin Chuang, Brooklyn, NY (US); Leigh Malnati, Mountain Lakes, NJ (US); Aravind Narasimhan, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 305 days.

(21) Appl. No.: 13/039,057

(22) Filed: Mar. 2, 2011

(65) Prior Publication Data

US 2012/0226546 A1  Sep. 6, 2012

(51) Int. Cl.
*G06Q 40/00* (2012.01)
*G06Q 20/12* (2012.01)
*G06Q 20/22* (2012.01)
*G06Q 20/32* (2012.01)

(52) U.S. Cl.
CPC ............... *G06Q 20/12* (2013.01); *G06Q 20/22* (2013.01); *G06Q 20/322* (2013.01)
USPC ....................................................... 705/39

(58) Field of Classification Search
CPC ..... G06Q 20/10; G06Q 40/00; G06Q 20/102; G06Q 20/04; G06Q 40/02
USPC ........ 705/39, 50–70, 500; 235/379–383, 385; 379/111–132, 284; 700/90–306
See application file for complete search history.

(56) References Cited

U.S. PATENT DOCUMENTS

| | | | |
|---|---|---|---|
| 7,729,925 B2 * | 6/2010 | Maritzen et al. | 705/1.1 |
| 8,381,971 B2 * | 2/2013 | Lambert et al. | 235/380 |
| 8,459,562 B1 * | 6/2013 | Field et al. | 235/492 |
| 2001/0054003 A1 * | 12/2001 | Chien et al. | 705/14 |
| 2003/0061093 A1 * | 3/2003 | Todd | 705/14 |
| 2003/0061097 A1 * | 3/2003 | Walker et al. | 705/14 |
| 2004/0035923 A1 * | 2/2004 | Kahr | 235/379 |
| 2007/0005492 A1 * | 1/2007 | Kim | 705/39 |
| 2007/0162387 A1 * | 7/2007 | Cataline et al. | 705/40 |
| 2007/0194109 A1 * | 8/2007 | Harrison et al. | 235/381 |
| 2008/0277465 A1 * | 11/2008 | Pletz et al. | 235/379 |
| 2009/0063312 A1 * | 3/2009 | Hurst | 705/30 |
| 2009/0070262 A1 * | 3/2009 | Olliphant et al. | 705/44 |
| 2009/0098825 A1 * | 4/2009 | Huomo et al. | 455/41.1 |
| 2010/0036770 A1 * | 2/2010 | Fourez et al. | 705/41 |
| 2010/0301113 A1 * | 12/2010 | Bohn et al. | 235/380 |
| 2011/0057025 A1 * | 3/2011 | Denzer et al. | 235/375 |

(Continued)

OTHER PUBLICATIONS

U.S. Appl. No. 61/427,062.*
John Gannon, "Maximizing rewards", May 11, 2009, Available at: http://johngannonblog.com/tag/amex/.*

(Continued)

*Primary Examiner* — Ryan D Donlon
(74) *Attorney, Agent, or Firm* — Snell & Wilmer L.L.P.

(57) ABSTRACT

Systems and methods for paying a transaction amount at a point of sale (e.g. a physical point of sale or a virtual point of sale) are disclosed. The systems and methods are configured to monitor transaction information to identify eligible transactions at the point of sale. Alternative funding options may be presented at substantially the same time as a transaction is being processed at a point of sale. Based on the user's selection, a credit may be applied to the transaction account corresponding with at least a portion of the transaction amount from the alternative funding source.

17 Claims, 4 Drawing Sheets

(56) References Cited

U.S. PATENT DOCUMENTS

2012/0158580 A1* 6/2012 Eram et al. .............. 705/39
2012/0158654 A1* 6/2012 Behren et al. ............ 707/626
2012/0166311 A1* 6/2012 Dwight et al. ........... 705/26.43
2012/0191569 A1* 7/2012 Shah ....................... 705/26.41
2013/0073446 A1* 3/2013 Lee et al. ................. 705/38

OTHER PUBLICATIONS

Microsoft Computer Dictionary, Microsoft Press, 5th Edition, Mar. 15, 2002.*
Barbara Marquand, "Credit Card Transaction Alerts Help Fight Fraud" Mar. 11, 2011 Available at: http://www.indexcreditcards.com/finance/creditcardtips/credit-card-transaction-alerts-help-fight-fraud.html.*

* cited by examiner

SYSTEM AND METHOD FOR SATISFYING A TRANSACTION AMOUNT FROM AN ALTERNATIVE FUNDING SOURCE

FIELD OF THE INVENTIONS

The present disclosure generally relates to payment of transaction amounts, and more particularly, to a method and system for paying transaction amounts with alternative funding sources at a point of sale.

BACKGROUND OF THE INVENTIONS

Traditional loyalty (e.g., incentive awards, frequency rewards, etc.) programs have been around for years. Loyalty programs are typically used to help businesses develop and maintain participant loyalty and are used as marketing tools to develop new clientele. A merchant and a transaction account issuer will often enter into a strategic alliance to offer a customer a branded transaction account with a loyalty program. The loyalty program provides incentives from both the merchant and the transaction account issuer. Moreover, the merchant and the transaction account issuer usually offer a consumer additional incentives for using earned incentives with the particular merchant, or allow the user to redeem loyalty awards that are stored with the transaction account issuer at the merchant.

Providing the user with the ability to use the incentive with the merchant typically requires technology and infrastructure which allows that merchant and the transaction account issuer to exchange incentive data (e.g. a loyalty account balance, eligibility, etc.). Given the variety of merchant and transaction account issuer systems, providing a solution that allows the transaction account issuer and the merchant to share information often requires the creation of custom technology. This custom technology typically is implemented on both the transaction account issuer and merchant systems. These systems are expensive to produce and must be individually maintained. Moreover, if the strategic alliance is terminated, the capital investment associated with creating the technology to link the merchant and the transaction account issuer is lost. Creating a strategic alliance also raises other business issues, including cross branding, sharing of confidential information, and potential competing business interest.

As such, it is desirable to a transaction account issuer to provide a user with the ability to use alternative funding sources in connection with purchases from a merchant, without the need to integrate an alternative funding payment system with the merchant.

SUMMARY OF THE INVENTIONS

The present disclosure describes systems and methods for paying a transaction amount at a point of sale (e.g. a physical point of sale, a virtual point of sale, website, etc). The systems and methods are configured to monitor transaction information. The transaction information comprises a transaction account used to pay for the transaction and the transaction amount. In an embodiment, where the transaction information conforms to predetermined rules, an indicator of an alternative funding source is provided by a module. The module may be an application, a portion of an application, a hardware or hardware-software combination provided through a browser, portable electronic device, or any other suitable device or medium. A user may select one or more of the alternative funding sources corresponding to the provided indicators. Based on the user's selection, a credit may be applied to the transaction account corresponding with at least a portion of the transaction amount from the alternative funding source. The credit may be applied in response to a completed transaction at the point of sale device. Moreover, the credit associated with the alternative funding source may not be communicated to the point of sale or the corresponding merchant, but rather is applied directly to the transaction account associated with the purchase of an item.

The systems and methods described herein may be configured to facilitate an initiation, processing or completion of a transaction at the point of sale. The various alternative funding sources described herein may include, for example a rewards account, checking account, a transaction account, and/or the like.

BRIEF DESCRIPTION OF THE DRAWINGS

A more complete understanding of the present disclosure may be derived by referring to the detailed description and claims when considered in connection with the Figures, wherein like reference numbers refer to similar elements throughout the Figures, and:

DETAILED DESCRIPTION

The detailed description of exemplary embodiments herein shows exemplary embodiments by way of illustration and its best mode. While these exemplary embodiments are described in sufficient detail to enable those skilled in the art to practice the disclosure, it should be understood that other embodiments may be realized and that logical, chemical and mechanical changes may be made without departing from the spirit and scope of the present disclosure. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step.

For the sake of brevity, conventional data networking, application development and other functional aspects of the systems (and components of the individual operating components of the systems) may not be described in detail herein.

In general, the systems and methods include a unique combination of one or more features associated with the redemption and application of alternative funding sources (e.g., debit accounts, transaction accounts, bank accounts, loyalty points, award accounts, incentive accounts, etc.). The alternative funding sources may be applied to transactions charged or otherwise applied against a transaction account at the time the transaction is initiated, processed, or completed at a point of sale. More specifically, a system and method is disclosed for detecting a transaction at a merchant point of sale (e.g. at a physical point of sale, at a virtual point of sale, a website, etc) and presenting the option to satisfy the transaction amount with a funding source that is different than the primary source of payment for the transaction. For example, a customer may purchase an item through a merchant website, and select a transaction account (e.g. an American Express Charge Card account) to pay for the transaction. In response to the indication that the customer is using a transaction account, the systems may provide the customer with an option to use an alternative payment source to satisfy the obligation on the transaction account corresponding to the purchase.

The systems may also be configured to provide the user with an option at a physical point of sale through a portable electronic device (e.g., a smart-phone, tablet computer, personal digital assistant, or other similar device known in the art or discussed herein). In one embodiment, a customer may conduct a purchase transaction for an item at a physical point of sale. The portable electronic device may be configured to passively detect a point of sale device. In response to either the initiation, processing, or completion of the transaction at the point of sale device, the customer (through a portable electronic) may be presented with alternative funding sources to satisfy the obligation corresponding to the purchase such that the customer may select a desired alternative funding source.

Alternative Funding Management System ("AFMS") 110 may allow a user to create credits and pay through various mediums using alternative funding sources, as further described in U.S. patent application Ser. No. 12/847,832, entitled System and Method for Rewards Redemption, and filed on Jul. 30, 2010, which is herein incorporated by reference in its entirety. Systems and methods for managing a rewards account are provided. In this context, AFMS 110 may be configured to receive a request to redeem loyalty points for a monetary value. The monetary value can be applied to particular eligible transactions associated with a transaction account. In an embodiment, to determine whether a transaction is an eligible transaction, the system analyzes transaction data for a plurality of transactions associated with a transaction account. The system then identifies an eligible transaction from the plurality of transactions, wherein the eligible transaction is based on a set of predefined rules (e.g. the type of item purchased, the vendor who provides the item, the merchant from whom the item was purchased). The system then displays the eligible transactions via a user interface. The system is configured to receive a selection of an eligible transaction, such that a monetary credit can be directed to the eligible transaction. In response to the selection, the system debits the loyalty points from a loyalty account, credits the monetary value (associated with the loyalty points) to the eligible transaction and revises the transaction account statement with the reduced amount owed.

Generally, users who conduct transactions with a transaction account enjoy benefits such as extended warranties, loyalty incentives, purchase incentives, discounts, extended return periods, satisfaction guarantees, and the like. However, some users prefer not to defer payment for an item until the bill for the transaction account arrives. As such, the system allows users to satisfy the payment obligations associated with purchases at the time of purchase, while still receiving the benefits of using a particular transaction account. Moreover, transaction account issuers that provide loyalty points and other similar incentives prefer to reduce the liability associated with such programs, by encouraging the account owner to spend rewards. The systems accomplish the transaction issuers' objectives by allowing loyalty and reward accounts to function as alternative funding sources at the point of sale. Moreover, the systems allow transaction accounts issuers to avoid investing substantial resources to create the infrastructure to allow an account owner to pay with loyalty points.

"User" may include any individual, customer, cardmember, employee, contractor, group, participant, beneficiary, account holder, account owner, recipient, charitable organization, software, hardware, and/or other entity that has an interest in a transaction account and/or a loyalty account award.

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument (or card). The term "transaction instrument" is used herein to be synonymous with the term "transaction account," unless indicated otherwise.

The terms "transaction", "purchase" and similar terms may be used interchangeably, and include any monetary or non-monetary agreement, exchange, negotiation, procedure, arrangement or other type of deal. The transaction may or may not include an exchange of an item.

A "transaction account code," "account," "account number" or "account code," as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

A "monetary value" or "credit value" as used herein, may include any statement credit, statement payment, statement debit, statement value, monetary credit, monetary transfer, credit monetary value, credit, discount, coupon, or similar benefit, provided to a user, directly or through a transaction account.

Phrases and terms similar to an "item" may include any good, service, information, experience, reward, points, coupons, credits, monetary equivalent, anything of value, something of minimal or no value, etc.

A "financial institution" may include any entity that offers transaction account services to recipients. Although often referred to as a "financial institution," the financial institution may represent any type of bank, brokerage, lender or other type of account issuing institution. It is further noted that other participants may be involved in some phases of the transaction, such as an intermediary settlement institution.

Figure 1:
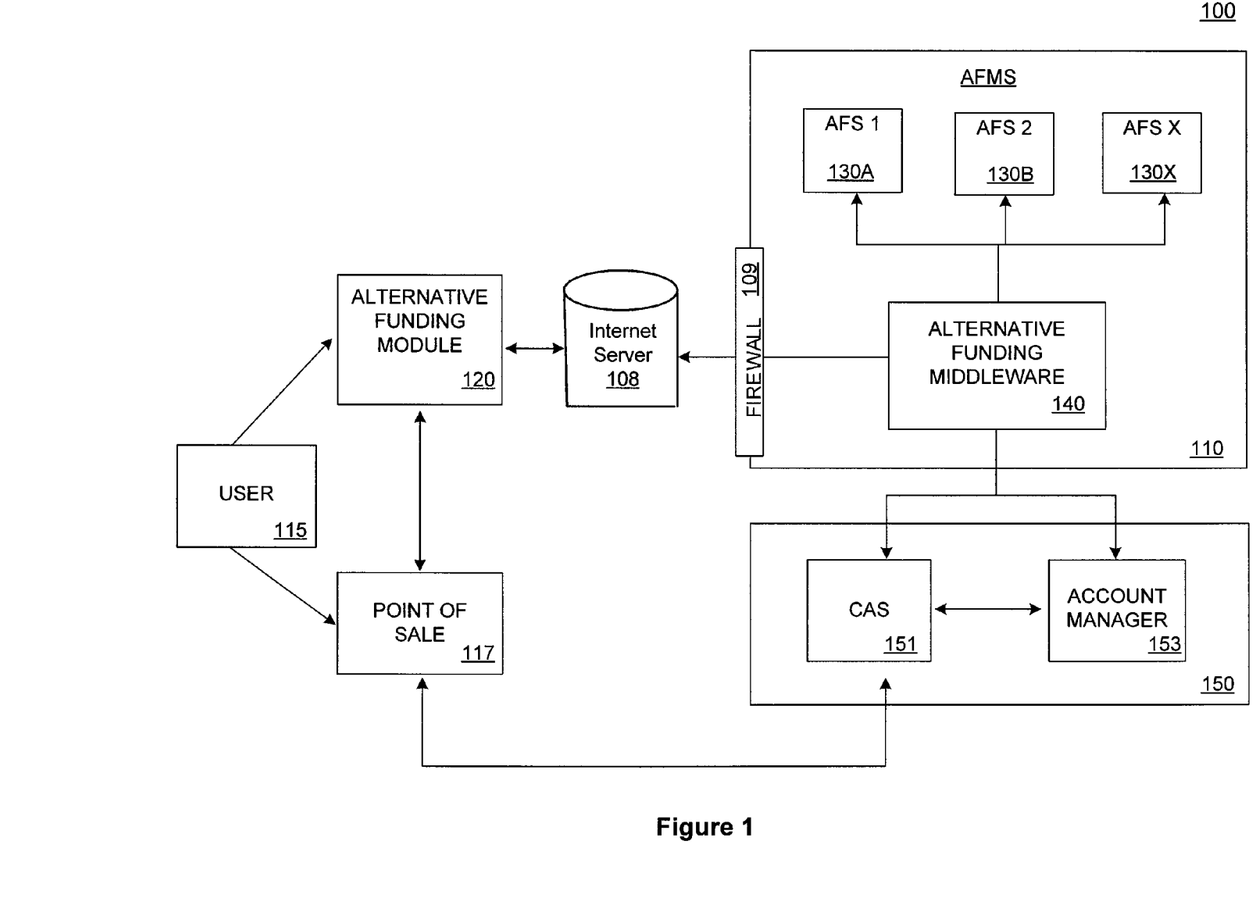
FIG. 1 is a block diagram illustrating major system components for satisfying a transaction amount with alternative funding sources, in accordance with an exemplary embodiment.

With reference to FIG. 1, and in accordance with an embodiment, system 100 may be any system configured to track, manage, analyze, identify, redeem, satisfy, and/or store financial transactions associated with a transaction account. System 100 may monitor, detect and/or acquire data from a point of sale device. System 100 may also track, manage, analyze, store, earn and/or redeem a monetary value from an alternative funding source. In an exemplary embodiment, system 100 comprises an AFMS 110 in electronic communication with a financial institution 150 and/or a user 115. In an embodiment, AFMS 110 may also be part of financial institution 150 or provided by financial institution 150.

AFMS 110 may comprise an alternative funding module, one or more alternative funding sources ("AFS"), and alternative funding middleware. AFMS 110 may be configured to interface with various systems at financial institution 150 including, for example, a card authorization system ("CAS") 151 and an account management system ("AMS") 153.

AFMS 110 may be provided independently of financial institution 150. AFMS 110 may be in communication with various components and/or systems of financial institution 150. AFMS 110 may be in electronic communication with CAS 151 and/or account manager 153. CAS 151 may be any software or hardware-software system configured to facilitate transactions associated with a transaction account. For example, an exemplary CAS 151 receives an authorization request from a merchant to determine if the financial transaction account associated with a transaction card number is valid and has sufficient credit. CAS 151 includes systems for comparing the transaction details (e.g., account number, monetary amount of transaction, expiration date, etc) with the users financial transaction account information to determine if the financial transaction account is active and if a sufficient credit limit exists to complete a transaction. If these conditions are satisfied, CAS 151 returns to the merchant an approval code reflecting that the merchant is authorized to complete the transaction.

AFMS 110 may also be configured to detect and/or receive transaction data from a point of sale. AFMS 110 may be configured to actively or passively detect a point of sale device. More particularly, with reference to FIG. 1, AFMS 110 may comprise an alternative funding module 120, one or more AFS 130A, AFS 130B and AFS 130X, an alternative funding source middleware 140, and may be configured to communicate with CAS 151, AMS 153, and/or other systems. Other systems may include, for example, reporting engines, management information systems, business information systems, third-party data providers and the like. Each of the systems may be interconnected by a network via any method and/or device described herein.

Alternative funding module 120 comprises any hardware and/or software suitably configured to facilitate requesting, retrieving, updating, analyzing, entering, selecting and/or modifying data. In one embodiment, alternative funding module 120 is configured to facilitate input, receipt and/or review of information relating to transactions initiated by user 115 at a point of sale. Alternative funding module 120 includes any device (e.g., personal computer), software, software component, add-on, extension, and/or the like, which communicates (in any manner discussed herein) with a point of sale 117 and/or AFMS 110 via any network discussed herein. Such browser applications comprise Internet browsing software installed within a computing unit or system to conduct online transactions and/or communications. These computing units or systems may take the form of a computer or set of computers, although other types of computing units or systems may be used, including laptops, notebooks, net books, smart phones, mobile phones, hand held computers, set-top boxes, workstations, computer-servers, main frame computers, mini-computers, PC servers, pervasive computers, network sets of computers, and/or the like. Practitioners will appreciate that alternative funding module 120 may or may not be in direct contact with AFMS 110. For example, alternative funding module 120 may access the services of AFMS 110 through another server, which may have a direct or indirect connection to Internet server 108.

An exemplary alternative funding module 120 may be configured to actively or passively detect a point of sale as discussed above. For example, alternative funding module 120 may operate within or as a portion of an Internet web browser such as, for example, Internet Explorer, Mozilla Firefox, Safari, Chrome, or any other suitable browser. Alternative funding module 120 may be configured to actively monitor and evaluate data on each web page viewed in the browser. Alternative funding module 120 may also be configured to evaluate data entered in the browser by a user (e.g. name, transaction account information, identity information, and/or the like). Alternative funding module 120 may comprise or take action based on a set of predefined set of rules.

The predefined rules may be stored at AFMS 110 or may be stored in alternative funding module 120. These predefined rules may comprise triggers, such that alternative funding module 120 communicates data, and/or displays options to a user in response to detecting particular content during a browser session such as, web page content or user provided content. In response to detecting a trigger, AFMS 110 and/or alternative funding module 120 may provide information to or request an input from a user.

Figure 2:
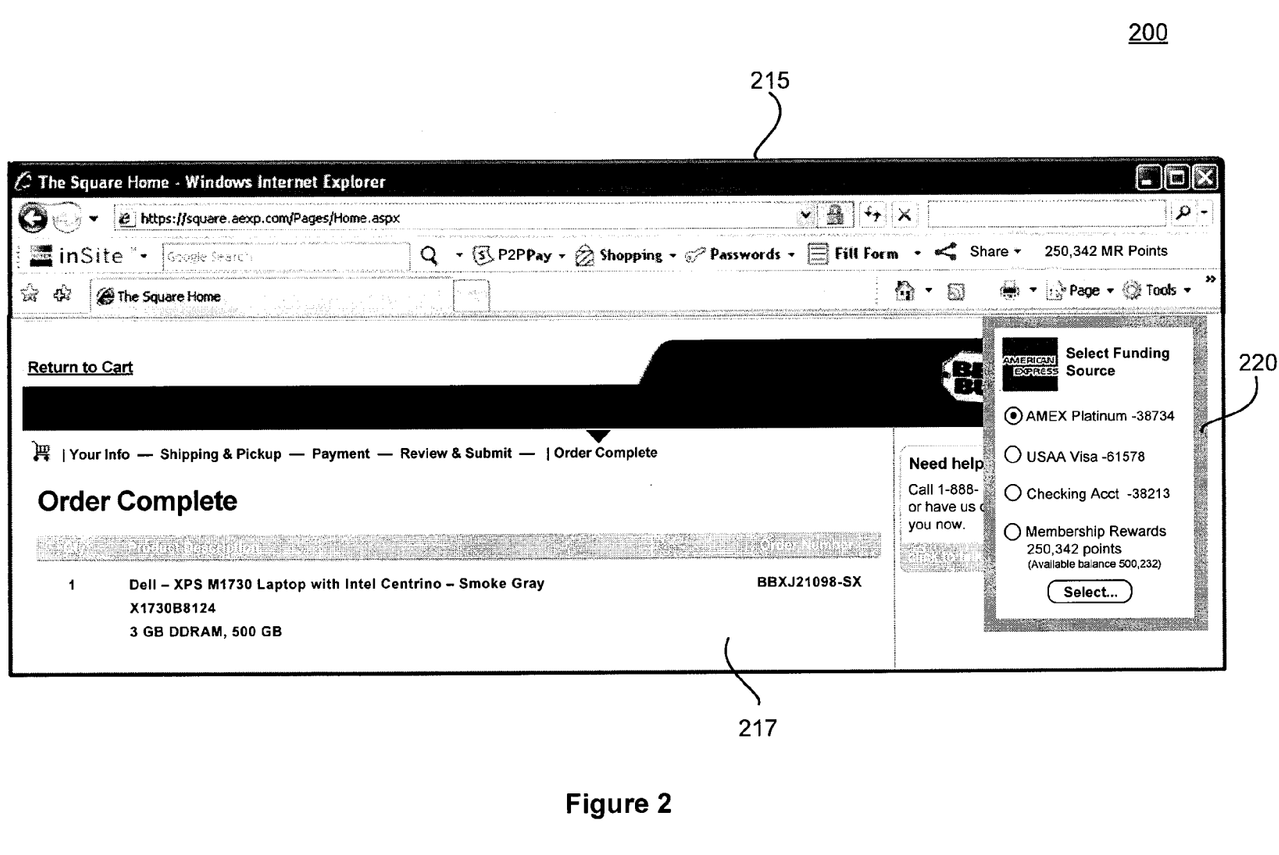
FIG. 2 is an exemplary browser session, in accordance with an exemplary embodiment.

In one embodiment and with momentary reference to FIG. 2, alternative funding module 220 may be over-laid or presented within a browser. Alternative funding module 220 may be continuously present in the browser session or may overlay the browser session in response to detecting a point of sale. Alternative funding module may comprise a list of one or more AFSs. These AFSs may include debit accounts (e.g. checking accounts, savings accounts, and the like), credit accounts, transactions accounts, rewards accounts, loyalty accounts, and the like. These AFSs may be provided by one or more account issuers. The AFSs may be selectable by a user. In response to the selection of one or more AFSs by the user, AFMS 110 and/or alternative funding module 220 may be configured to compile a credit from the selected AFSs. This credit may be associated with the transaction account used to purchase an item in the browser session or may be transmitted to the account issuer of the transaction account used to make the purchase. It should be noted that the selection by the user and transmission of the credit occur at substantially the same time as the purchase transaction. As such, a user does not need to separately access a transaction account, rewards account, a do business with a merchant that allows a user to pay with a transaction account and fund a purchase with an integrated alternative funding system. In other words, the AFMS 120 and/or alternative funding module 220 allow the user to select an AFS and transmit the credit from the AFS independent of a the particular merchant or point of sale.

In an embodiment and with reference again to FIG. 1, alternative funding module 120 may also be configured to passively detect a point of sale device. For example, where alternative funding module 120 is present in a portable electronic device, alternative funding module 120 may be configured with a trigger that provides or requests information in response to receiving a trigger (e.g. a signal from a point of sale). In the context of a mobile device, alternative funding module 120 may also be embodied as an application or extension of an application, and may actively detect a point of sale as discussed above.

As those skilled in the art will appreciate, alternative funding module 120 may comprise of be configured to interact and operate within an operating system (e.g., Windows NT, 95/98/2000/XP/Vista/7, OS2, UNIX, Linux, Solaris, MacOS, Android, iOS, etc.). Alternative funding module 120 may include any suitable personal computer, network computer, workstation, minicomputer, mainframe or the like. Alternative funding module 120 can operate in a home or business environment with access to a network. In an exemplary embodiment, access is through a network or the Internet through a commercially available web-browser software package.

Alternative funding module 120 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Alternative funding module 120 may include any number of applications, code modules, cookies, and/or the like to facilitate interaction with AFMS 110, point of sale 117 and/or financial institution 150 in order to for example, view statements, view transactions terms, view transaction information, submit/authorize a transactions, access AFSs, create credits, and the like. In one embodiment, alternative funding module 120 may store, receive, access, or otherwise have user 115 preferences and/or any other information disclosed herein on a hard drive or any other local memory device. Accordingly, alternative funding module 120 may retrieve and store recipient information within a memory structure of alternative funding module 120 in the form of a browser cookie, for example. In another embodiment, alternative funding module 120 retrieves information relating to user 115 from AFMS 110, point of sale 117, and/or financial institution 150 on establishing a session with Internet server 108.

In an embodiment, account manager 153 is any software and/or hardware suitably configured to receive, store, and/or reconcile pending and posted transaction to a transaction account. For example, upon completion of a transaction (or a series of transactions), the merchant transmits a record of charges (ROC) and summary of charges (SOC) request to the account manager 153 requesting to be paid for the transaction. The ROC file generally contains transaction details which could include the merchant identification number, amount of purchase, date of purchase, and expiration date. The account manager 153 posts the ROC to the transaction account. At the end of a billing cycle, account manger 153 consolidates any pending posted ROCs to the account and issues a statement summarizing the ROCs and requesting payment. Typically, the statement contains a minimum obligation associated with the transaction account (e.g. a minimum payment) and a variety of other payment options. The statement may be provided as a physical paper statement, and electronic statement, or any other suitable form.

Firewall 109, as used herein, may comprise any hardware and/or software suitably configured to protect AFMS 110 components from users of other networks. Firewall 109 may reside in varying configurations including stateful inspection, proxy based and packet filtering among others. Firewall 109 may be integrated as software within Internet server 108, any other AFMS 110 components or may reside within another computing device or may take the form of a standalone hardware component.

Internet server 108 may include any hardware and/or software suitably configured to facilitate communications between alternative funding module 120 and one or more AFMS 110 components. Further, Internet server 108 may be configured to transmit data to alternative funding module 120 within markup language documents. As used herein, "data" may include encompassing information such as commands, queries, files, data for storage, and/or the like in digital or any other form. Internet server 108 may operate as a single entity in a single geographic location or as separate computing components located together or in separate geographic locations.

Internet server 108 may provide a suitable web site or other Internet-based graphical user interface which is accessible by recipients. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

AFMS 110 or any other components discussed herein may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

Alternative funding middleware 140 may include any hardware and/or software suitably configured to facilitate communications and/or process transactions between disparate computing systems. Alternative funding middleware server and/or application 140 may serve as an intermediary between the various systems to ensure appropriate communications between disparate platforms. Middleware components are commercially available and known in the art. Alternative funding middleware 140 may be implemented through commercially available hardware and/or software, through custom hardware and/or software components, or through a combination thereof. Alternative funding middleware 140 may reside in a variety of configurations and may exist as a standalone system or may be a software component residing on the Internet server 108. Alternative funding middleware 140 may be configured to process transactions between the various components of AFMS 110 and financial institution 150 and any number of internal or external systems 100 for the purposes disclosed herein.

As will be appreciated by one of ordinary skill in the art, one or more of the components of system 100 may be embodied as a customization of an existing system, an add-on product, upgraded software, a stand alone system (e.g., kiosk), a distributed system, a method, a data processing system, a device for data processing, a computer and/or a computer program product. Accordingly, individual system 100 components may take the form of an entirely software embodiment, an entirely hardware embodiment, or an embodiment combining aspects of both software and hardware. In one embodiment, a system 100 component (e.g. a computer) may include a processor, a memory, a communications interface, a network interface, etc. Furthermore, individual system 100 components may take the form of a computer program product on a computer-readable storage medium having computer-readable program code means embodied in the storage medium. Any suitable computer-readable storage medium may be utilized, including hard disks, CD-ROM, flash memory, optical storage devices, magnetic storage devices, and/or the like. In one embodiment, a system 100 components and/or subsystems comprise a network interface communicating with a memory, the memory communicating with a processor; and the processor, when executing a computer program, configured to accomplish a variety of functions and/or steps.

The system discussed herein contemplates uses in association with web services, utility computing, pervasive and individualized computing, security and identity solutions, autonomic computing, commodity computing, mobility and wireless solutions, open source, biometrics, grid computing and/or mesh computing.

In one embodiment, and with continued reference to FIG. 1, AFMS 110 may be configured as an alternative funding source broker system. Transaction accounts, reward accounts, loyalty accounts, and/or other alternative funding source accounts may originate from any source and may be associated with AFMS 110. AFMS 110 may be configured to co-locate AFS 130A, AFS 130B . . . and AFS 130X. AFMS 110 may also be configured to combine portions of one or more AFS to create credits (e.g. a portion of the credit may be attributable to a transaction account, a portion of the credit may be attributable to a reward or loyalty account, and a portion of the credit may be attributable to a stored value or debit account).

With respect to loyalty and/or reward points, AFMS 110 may also be configured to convert the points such that the points have a standard value. AFMS 110 may also be configured with various conversion ratios such that points from various sources can be converted based on the value of the originated account. For example, providing a weighted conversion where points from a first account have a higher conversion value than points from a second account, but where points from both the first and second account can be combined in a common account such that each point in the common account has the same value. In other words, ten (10) Delta Airlines points may be converted to one (1) common account point and twenty (20) Hilton Hotel points may be converted to five (5) common account points, so the total points in the common account from these sources is six (6).

In an embodiment, AFMS 110 may be configured to provide an incentive to a user to induce a particular transaction or behavior (e.g. use reward points to satisfy a particular transaction or satisfy a transaction prior to a statement being issued or being due). AFMS 110 may be configured to provide an award of loyalty points to an associated loyalty account where a user pays for an eligible transaction, before the statement date for the eligible transaction. Similarly, AFMS 110 may be configured to provide an alternative higher point to monetary value conversion ratio where an eligible transaction is paid before a statement date. As such AFMS 110 may provide a user with an incentive for prepayment, as described in U.S. patent application Ser. No. 10/750,030, entitled Method and Apparatus for Automatically Processing Invoiced Payments with Selectable Payment Terms, and filed on Dec. 31, 2003, which is herein incorporated by reference in its entirety.

As discussed above, AFMS 110 and/or an alternative funding module may comprise predefined rules. The predefined rules or triggers may be used to analyze points of sale and/or transactions to determine whether the transactions should be processed by AMFS 110 or alternatively funding source module 120. The predefined rules may be created by a user, a financial transaction account issuer, a loyalty account provider, a merchant, a vendor and/or the like. For example, a user, merchant, transactions account issuer, or some combination thereof may define the rules or triggers to include, for example, a threshold amount for a transaction, a particular list of merchants, a particular transaction account to initiate a transaction at a point of sale device, and/or the like to activate AFMS 110 and/or alternative funding module 120.

In various embodiments, the predefined rules may be based on any attribute contained in the transaction data, including for example, the type of merchant from whom the transaction originated the amount of the transactions, the type of item being purchased, the transaction history of an eligible financial account and/or any other suitable criteria. As such, a user, a financial transaction account issuer, a loyalty account host, a third party and/or the like may create predefined rules that allow specific transactions to be identified and/or sorted by an attribute(s) of the transaction data.

Transactions (which partially or fully meet the criteria of a predefined rule) may be identified by AFS 110 and/or alternative funding module 120. As such, alternative funding module 120 may be triggered in response to detecting an eligible transactions at a point of sale at the initiation of a transaction (e.g. adding an item to a cart or in response to receiving a user selection to checkout), during a transaction (e.g. in response to providing transaction account information, user information, or the like), and/or upon completion of a transaction (e.g. receiving confirmation of a purchase from a point of sale).

In an embodiment, where a transaction is partially or fully ineligible, the AFS 110 and/or alternative funding module 120 may not be triggered, may provide a message to the user indicating that the transaction is ineligible, and/or allow the transaction to proceed without taking any action. Similarly, where a transaction is partially or fully eligible, but otherwise is subject to another action (e.g., the transaction has been identified as a possible fraudulent transaction, the transaction is in dispute, or is subject to another action), the transaction may not be identified by AFS 110 and/or alternative funding module 120 and/or selectable through alternative funding module 120.

In an embodiment, AFS 110 and/or alternative funding module 120 may be configured to credit a partial amount of a transaction amount. For example, a partial amount may be applied where at least a portion of the transaction amount is associated with one or more eligible transactions and/or the partial amount is based on the amount of AFSs available.

In an embodiment, and with continued reference to FIG. 1, AFS 110 and/or alternative funding module 120 may be at least partially configured within a mobile device. The mobile device may be any mobile device which is at least intermittently connectable to a network and configured to run a customizable micro-application (hereinafter "micro-app"). The mobile device may be a smart-phone, including for example a mobile telephone configured with a Palm mobile operating system, a Windows mobile operating system, an Android Operating System, Apple iOS, a Blackberry operating system and the like, a tablet PC, including for example an iPad, a portable electronic device, including for example a PDA, an iPod Touch, and the like, or any other suitable mobile device.

In an embodiment, the mobile device may be configured with alternative funding module 120. Alternative funding module 120 may take the form of a micro-app or any other suitable interface. Alternative funding module 120 may be configured to display various AFSs which reside within AFMS 110. The AFSs may include, for example, point balances, account balances, recent eligible transactions, and the like. Alternative funding module 120 may also be configured to conduct various activities, including for example, sorting AFSs, applying points and/or monetary values, consolidating points/and or monetary values, applying a credit to a transaction, and/or the like.

In an embodiment, the mobile device may be configured to complete transactions with merchant 217 at a point of sale. The mobile device may be configured to communicate with a point of sale via any suitable communications protocol in response to an active or passive indication of the point of sale. The mobile device may automatically connect to a point of sale.

In various embodiments, the user may complete transactions with a network connection present, or where no network connection is present, based on various authorization rules. In one embodiment, the mobile device is connected to a network and a point of sale. The mobile device may be configured to provide account information to the point of sale. This account information may enable the point of sale device to communicate with an account issuer. The account issuer may administer the transaction account and AFS 110. AFS 110 may also be administered by a third party that is in contact with the account issuer. In response to the point of sale receiving the account information, the point of sale may provide transaction information to the account issuer (e.g. the product and/or service identifier for each item being purchased and the transaction amount for each item being purchased). The transaction account issuer may initiate an authorization process where each product and/or service identifier is evaluated to determine whether the product is an eligible transaction. As used herein, an eligible transaction may be any transaction associated with a payment initiated by a mobile device. In response to eligible transactions being identified, alternative funding source module 120 may present a list of AFSs. This balance of each AFSs may be compared to transaction amount, to determine which transactions may be satisfied with AFSs.

In an embodiment, alternative funding module 120 may be configured to sync with AFMS 110 each time a network connection is present. Moreover, alternative funding module 120 may be configured to complete a predetermined number of transactions before alternative funding module 120 syncs with AFMS 110 again. For example, where the mobile device is in airplane mode and there is no network connection present, the user may complete a transaction via alternative funding module 120 providing that the transaction meets the authorization rules within alternative funding module 120 (e.g. the one of more AFS has a sufficient balance of points to complete the transaction as of the last sync with AFMS 110).

In an embodiment, alternative funding module 120 and AFMS 110 may be associated with various AFSs. AFMS 110 may be configured to credit a transaction amount where the transaction meets the criteria for an eligible transaction, but there are not sufficient rewards points to satisfy the total amount associated with the transaction. Where there are not sufficient points, AFMS 110 may be configured to authorize a payment comprising rewards points and a monetary value from one or more of the associated transaction accounts.

Figure 3:
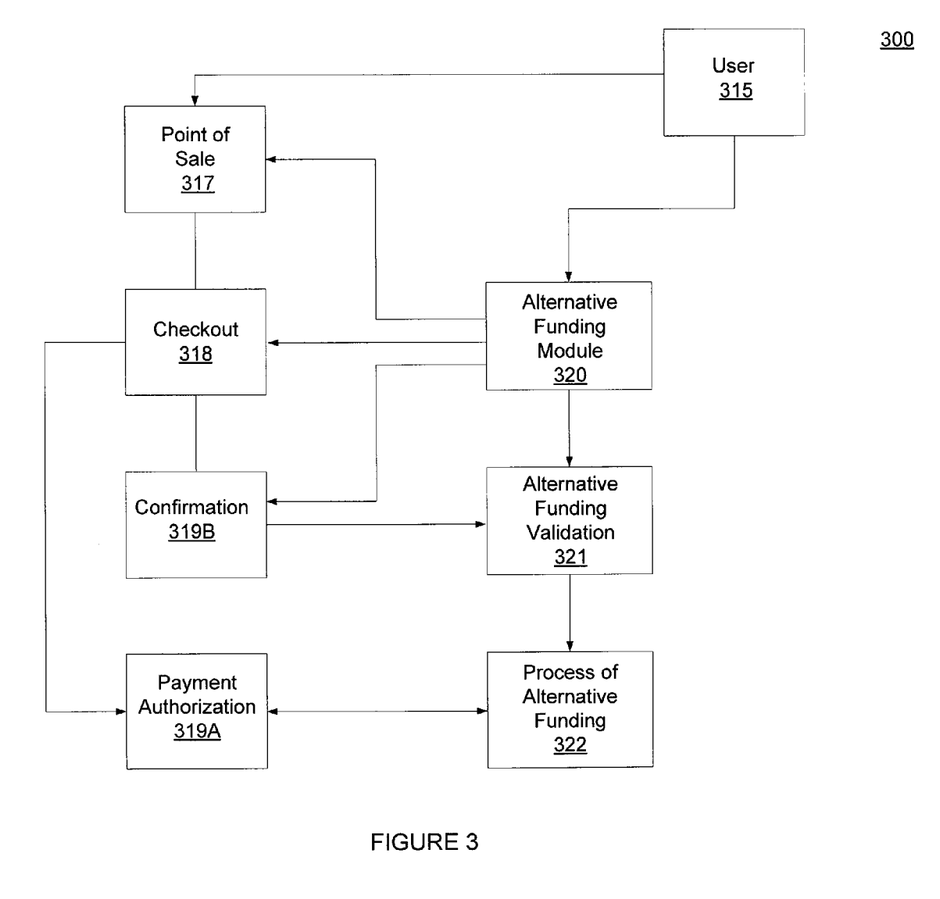
FIG. 3 is a block diagram illustrating modules and processes for satisfying a transaction amount with alternative funding sources, in accordance with an exemplary embodiment.
Figure 4:
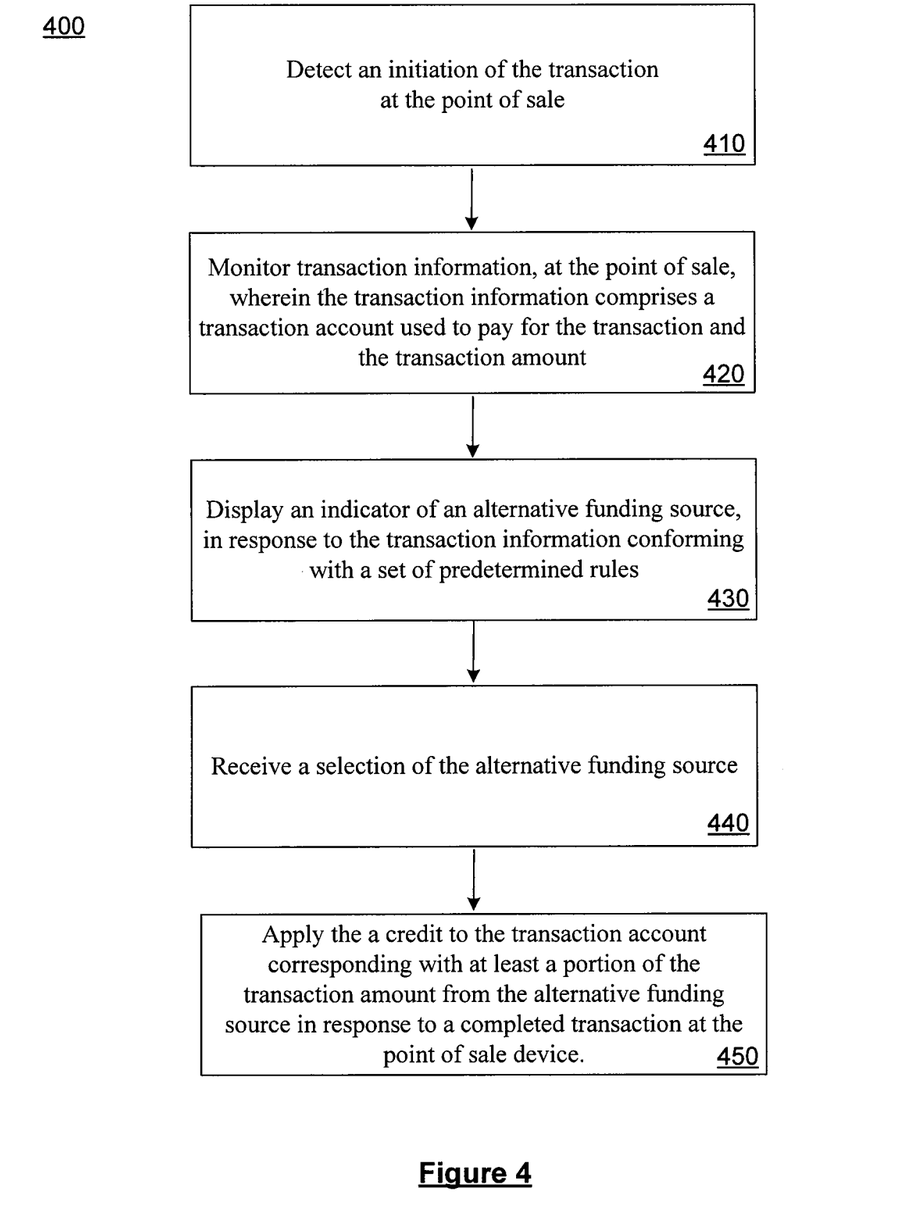
FIG. 4 is a flow chart illustrating an exemplary process for satisfying a transaction amount with alternative funding sources, in accordance with an exemplary embodiment.

With reference to FIG. 3 and FIG. 4, and in accordance with various embodiments, alternative funding module 320 may be configured to detect a point of sale 317 (Step 410). As discussed above, alternative funding module 320 may be configured to detect a transaction at any point between the initiation of the transaction and completion of the transaction. For example, alternative funding module 320 may be configured to monitor the transaction account, the transaction amount, and transaction information during the transaction process (Step 420).

Alternative funding module 320 may comprise alternative funding validation 321. Alternative funding validation 321 may be configured to evaluate the transaction account, the transaction amount and transaction information detected during the transaction process and trigger processing of alternative funding based on the progress of the transaction. Alternative funding validation may be configured to validate a particular transaction against the predetermined rules discussed above and determine whether a particular transaction is eligible for alternative funding. Based on a positive determination, alternative funding module 320 may request information from a user 315 regarding selection of one of more AFS (Step 430). For example, alternative funding module may be configured to process alternative funding upon completion of the transaction as evidenced by, for example, a payment authorization 319A or a confirmation 319B (Step 440). In response to the transaction being completed and a determination that the transaction is eligible user 315 may be presented with one or more AFS, which may be selectable through alternative funding module 320. Upon receipt of the alternative funding selection from user 315, alternative funding module 320 may be configured to credit at least a portion of the transaction amount to the transaction account associated with the purchase of an eligible item, before the transaction posts to the transaction account in at substantially the same time as the transaction is completed (e.g. in the browser session where the transaction was initiated and completed by user 315).

An alternative funding source management system for use in a telecommunications network may also interface with the embodiments herein. In particular, such a system includes a mobile communication device configured to communicate over a wireless telecommunication network, a telecommunication service provider configured to facilitate a connection to the wireless telecommunication network, an alternative funding source management system, a financial institution, and a communication network providing communication between the telecommunication service provider, the alternative funding source management system, and the financial institution. The alternative funding source management system includes a one or more AFS and is configured to track activities associated with the various values of each AFS, and determine a monetary value associated with the any non-monetary AFS and a alternative funding middleware which facilitates communication of the one of more AFSs with a financial institution such that the AFSs can be used to satisfy obligations associated with a transaction account processed by the financial institution on the connection.

An alternative funding source management system for a peer-to-peer transaction may also interface with the embodiments herein. In particular, such a system includes first and second personal communication devices configured to participate in a peer-to-peer transaction, an alternative funding source management system, and a communication network providing two-way communication between one of said personal communication devices and the alternative funding source management system. The alternative funding source management system includes one or more AFS and is configured to track activities associated with the various values of each AFS, and determine a monetary value associated with the any non-monetary AFS and a alternative funding middleware which facilitates communication of the one of more AFSs with a financial institution such that the AFSs can be used to satisfy obligations associated with a transaction account processed by the financial institution on the connection.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (e.g. http://yahoo.com/stockquotes/ge) and an IP address (e.g. 123.4.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

In order to control access to any component of AFMS 110, Internet server 108 may invoke an authentication server (not shown) in response to user 115 submissions of authentication credentials received at Internet server 108 from alternative funding module 120. The authentication server may include any hardware and/or software suitably configured to receive authentication credentials, encrypt and decrypt credentials, authenticate credentials, and grant access rights according to privileges (e.g., pre-defined privileges) attached to the credentials. The authentication server may grant varying degrees of application and data level access to users based on information stored within a database and/or any other known memory structure.

One skilled in the art will appreciate that system 100 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of system 100, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with system 100 by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 100, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system 100 includes any of various suitable security features, such as firewalls, access codes, encryption, decryption, compression, decompression, and/or the like.

In addition to those described above, the various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present disclosure. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term "network" shall include any cloud, cloud computing, electronic communication or other means which incorporate both hardware and software components of such. Communication among the parties may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards And Protocols (1998); Java 2 Complete, various authors, (Sybex 1999); Deborah Ray And Eric Ray, Mastering Html 4.0 (1997); and Loshin, TCP/IP Clearly Explained (1997) and David Gourley and Brian Totty, HTTP, The Definitive Guide (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The disclosure may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices. Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, or C' or 'at least one of A, B, and C' are used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

We claim:

1. A method comprising:
   monitoring, by a computer system for paying a transaction amount, transaction information at a point of sale device, the transaction information comprises a transaction account used to pay for a completed payment transaction and the transaction amount, wherein the computer system comprises a memory, a processor and a network interface;
   displaying, by the computer system and through a module, an indicator of an alternative funding source, in response to the transaction information conforming with a set of predetermined rules, the module installed in a web browser as at least one of an add-on and an extension, and wherein the module is configured to overlay the web browser in response to detecting the point of sale device;
   receiving, by the computer system and through the module, a selection of the alternative funding source; and
   applying, by the computer system, a credit to the transaction account corresponding with at least a portion of the transaction amount from the alternative funding source, in response to the completed payment transaction at the point of sale device.

2. The method of claim 1, further comprising detecting, by the computer system, an initiation of the transaction at the point of sale device.

3. The method of claim 1, wherein an alternative funding source is a rewards account.

4. The method of claim 1, wherein an alternative funding source is a checking account.

5. The method of claim 1, wherein the point of sale device is a virtual point of sale.

6. The method of claim 1, further comprising comparing, by the computer system, the transaction account to a list of eligible transaction accounts.

7. The method of claim 1, further comprising receiving, by the computer system, identification information, wherein the identification information is used to authorize the alternative funding source.

8. The method of claim 1, further comprising, displaying a balance of the alternative funding source at the point of sale device.

9. The method of claim 1, wherein the point of sale device is a web based point of sale, and wherein the alternative funding source is presented within the web based point of sale.

10. The method of claim 1, wherein a user applies at least a portion of the alternative funding source to the transaction account, regardless of accessing a web page associated with the alternative funding source.

11. The method of claim 1, determining, by the computer system, a second amount associated with the transaction amount, in response to the selection of the alternative funding source, wherein the second amount is determined based on a set of rules.

12. The method of claim 1, wherein the module is configured to actively detect the presence of a virtual point of sale.

13. The method of claim 1, wherein the module is configured to passively detect the presence of a point of sale device, and wherein the module is activated in response to receiving a signal from the point of sale device.

14. The method of claim 1, wherein the alternative funding source is selected without notifying the point of sale device.

15. The method of claim 1, wherein a merchant providing the point of sale device processes the payment through the transaction account.

16. A computer based system comprising:
a network interface communicating with a non-transitory memory;
the memory communicating with a processor for paying a transaction amount; and
the processor, when executing a computer program, is configured to:
monitoring, by the processor, transaction information at a point of sale device, wherein the transaction information comprises a transaction account used to pay for a completed payment transaction and the transaction amount;
displaying, by the processor and through a module, an indicator of an alternative funding source, in response to the transaction information conforming with a set of predetermined rules, wherein the module is installed in a web browser as at least one of an add-on and an extension, and wherein the module is configured to overlay the web browser in response to detecting the point of sale device;
receiving, by the processor, and through the module, a selection of the alternative funding source; and
applying, by the processor, a credit to the transaction account corresponding with at least a portion of the transaction amount from the alternative funding source, in response to the completed payment transaction at the point of sale device.

17. A method comprising:
monitoring, by a computer system for paying a transaction amount, transaction information at a point of sale device, wherein the transaction information comprises a transaction account used to pay for a completed payment transaction and the transaction amount, wherein the computer system comprises a processor, a memory, and a network interface;
displaying, by the computer system and through a module, an indicator of an alternative funding source, in response to the transaction information conforming with a set of predetermined rules, the module is installed on a smartphone and is activated in response to detecting a point of sale device;
receiving, by the computer system and through the module, a selection of the alternative funding source; and
applying, by the computer system, a credit to the transaction account corresponding with at least a portion of the transaction amount from the alternative funding source, in response to the completed payment transaction at the point of sale device.

* * * * *